(12) United States Patent
Ikuta et al.

(10) Patent No.: US 10,704,484 B2
(45) Date of Patent: Jul. 7, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Eiji Ikuta, Oobu (JP); Yuki Nose, Kasugai (JP); Yoshiyuki Shogenji, Toyota (JP); Keiichi Myojo, Okazaki (JP); Misako Ban, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 102 days.

(21) Appl. No.: 16/145,350

(22) Filed: Sep. 28, 2018

(65) Prior Publication Data

US 2019/0107070 A1    Apr. 11, 2019

(30) Foreign Application Priority Data

Oct. 5, 2017    (JP) .................. 2017-195139

(51) Int. Cl.
| | | |
|---|---|---|
| *F02D 41/00* | (2006.01) | |
| *F02D 41/14* | (2006.01) | |
| *F02D 33/00* | (2006.01) | |
| *F02D 41/02* | (2006.01) | |
| *F02D 41/18* | (2006.01) | |

(Continued)

(52) U.S. Cl.
CPC ......... *F02D 41/1408* (2013.01); *F02D 33/00* (2013.01); *F02D 41/008* (2013.01); *F02D 41/0085* (2013.01); *F02D 41/025* (2013.01); *F02D 41/08* (2013.01); *F02D 41/18* (2013.01);

(Continued)

(58) Field of Classification Search
CPC .... F02D 41/1408; F02D 41/025; F02D 41/18; F02D 41/008; F02D 41/08; F02D 41/0085; F02D 33/00; F02D 2200/0611; F02P 5/1508; F02P 5/045
See application file for complete search history.

(56) References Cited

U.S. PATENT DOCUMENTS 6,543,219 B1 * 4/2003 Surnilla ............... F01N 3/0842
60/274
6,745,747 B2 * 6/2004 Surnilla ............... F01N 3/0842
123/198 F (Continued)

FOREIGN PATENT DOCUMENTS

| EP | 1 630 388 | 3/2006 |
|---|---|---|
| JP | 2004-218541 | 8/2004 |

*Primary Examiner* — Phutthiwat Wongwian
*Assistant Examiner* — Sherman D Manley
(74) *Attorney, Agent, or Firm* — Finnegan, Henderson, Farabow, Garrett & Dunner, LLP

(57) ABSTRACT

A controller for an internal combustion engine includes processing circuitry configured to execute: a dither control process of operating fuel injection valves to designate at least one of cylinders as a lean combustion cylinder, in which an air-fuel ratio is leaner than a stoichiometric air-fuel ratio, and to designate at least another one of the cylinders as a rich combustion cylinder, in which an air-fuel ratio is richer than the stoichiometric air-fuel ratio; and an idle-time limiting process of causing an absolute value of a difference between the air-fuel ratio in the lean combustion cylinder and the air-fuel ratio in the rich combustion cylinder to be smaller when the internal combustion engine is idling than when the internal combustion engine is not idling.

8 Claims, 5 Drawing Sheets

(51) Int. Cl.
   *F02P 5/15* (2006.01)
   *F02P 5/04* (2006.01)
   *F02D 41/08* (2006.01)

(52) U.S. Cl.
   CPC ............ *F02P 5/045* (2013.01); *F02P 5/1508* (2013.01); *F02D 2200/0611* (2013.01)

(56) References Cited

U.S. PATENT DOCUMENTS

| | | | | |
|---|---|---|---|---|
| 6,769,398 | B2 * | 8/2004 | Surnilla | ............ F02D 41/0045 |
| | | | | 123/198 F |
| 6,868,827 | B2 * | 3/2005 | Surnilla | ................ F01N 3/2006 |
| | | | | 123/339.11 |
| 7,032,572 | B2 * | 4/2006 | Bidner | .................. F01N 3/0814 |
| | | | | 123/406.47 |
| 7,886,523 | B1 * | 2/2011 | Legare | .................. F02D 41/008 |
| | | | | 60/274 |
| 9,726,101 | B2 * | 8/2017 | Suzuki | ................ F02D 41/2461 |
| 2002/0038541 | A1 * | 4/2002 | Sumilla | ............. B01D 53/9495 |
| | | | | 60/274 |
| 2003/0221418 | A1 | 12/2003 | Surnilla | |
| 2005/0109318 | A1 * | 5/2005 | Ichihara | ............. F02D 41/0085 |
| | | | | 123/406.45 |
| 2019/0107070 | A1 * | 4/2019 | Ikuta | .................. F02D 41/1408 |

* cited by examiner $aij > cij > bij$ $s < t \Rightarrow \begin{cases} aks < akt & ask > atk \\ bks < bkt & bsk > btk \\ cks < ckt & csk > ctk \end{cases}$

CONTROLLER AND CONTROL METHOD FOR INTERNAL COMBUSTION ENGINE

BACKGROUND

The present disclosure relates to a controller and a control method for an internal combustion engine mounted on a vehicle.

For example, Japanese Laid-Open Patent Publication No. 2004-218541 discloses a controller that executes dither control. In the dither control, when there is a requirement for an increase in the temperature of a catalyst device (exhaust purification device), at least one of the cylinders is treated as a rich combustion cylinder, in which the air-fuel ratio is richer than the stoichiometric air-fuel ratio, and the remaining cylinders are treated as lean combustion cylinders, in which an air-fuel ratio is leaner than the stoichiometric air-fuel ratio.

When executing the dither control as described above, the torque generated by the combustion in the lean combustion cylinders is smaller than the torque generated by the combustion in the rich combustion cylinder. This increases the rotational fluctuation of the engine crankshaft. For this reason, the execution of the dither control when the user is likely to feel the vibration of the internal combustion engine as during idle time may cause the user to experience discomfort.

SUMMARY

Examples of the present disclosure will now be described.

Example 1

A controller for an internal combustion engine mounted on a vehicle is provided. The internal combustion engine includes an exhaust purification device configured to purify exhaust gas discharged from a plurality of cylinders and a plurality of fuel injection valves provided for the respective cylinders. The controller includes processing circuitry configured to execute a dither control process and an idle-time limiting process. The dither control process is a process of operating the fuel injection valves to designate at least one of the cylinders as a lean combustion cylinder, in which an air-fuel ratio is leaner than a stoichiometric air-fuel ratio, and to designate at least another one of the cylinders as a rich combustion cylinder, in which an air-fuel ratio is richer than the stoichiometric air-fuel ratio. The idle-time limiting process is a process of causing an absolute value of difference between the air-fuel ratio in the lean combustion cylinder and the air-fuel ratio in the rich combustion cylinder to be smaller when the internal combustion engine is idling than when the internal combustion engine is not idling.

The user is more likely to feel vibration of the internal combustion engine when the engine is idling than when the engine is not idling. Accordingly, the idle-time limiting process is executed to cause the absolute value of the difference between the air-fuel ratio in the lean combustion cylinder and the air-fuel ratio in the rich combustion cylinder to be smaller when the engine is idling than when the engine is not idling, thereby reducing the absolute value of the difference between the torque generated by combustion in the lean combustion cylinder and the torque generated by combustion in the rich combustion cylinder. This suppresses the discomfort experienced by the user due to the dither control process.

Example 2

In the controller of Example 1, the idle-time limiting process includes a process of causing the absolute value of the difference between the air-fuel ratio in the lean combustion cylinder and the air-fuel ratio in the rich combustion cylinder to be smaller when the internal combustion engine is idling and the vehicle is in a stopped state than when the internal combustion engine is idling and the vehicle is traveling.

When the vehicle is in a stopped state, the driving noise is low as compared with when the vehicle is traveling, and therefore the user is likely to notice vibration of the engine. Accordingly, the idle-time limiting process includes a process of causing the absolute value of the difference between the air-fuel ratio in the lean combustion cylinder and the air-fuel ratio in the rich combustion cylinder to be smaller when the vehicle is in a stopped state than when the vehicle is traveling. This suppresses the discomfort experienced by the user due to the dither control process when the vehicle is in a stopped state.

Example 3

In the controller of Example 1 or Example 2, the idle-time limiting process includes a process of causing, when the internal combustion engine is idling and the vehicle is in a stopped state, the absolute value of the difference between the air-fuel ratio in the lean combustion cylinder and the air-fuel ratio in the rich combustion cylinder to be smaller in a case in which a transmission of the vehicle is in a D-position than in a case in which the transmission is in an N-position.

When the vehicle is in a stopped state, vibration of the engine is more easily transmitted to the vehicle body via the crankshaft in a case in which the transmission is in the D-position than in a case in which the transmission is in the N-position. Thus, the user easily feels the engine vibration with the transmission in the D-position. Accordingly, the idle-time limiting process includes a process of causing, when the vehicle is in a stopped state, the absolute value of the difference between the air-fuel ratio in the lean combustion cylinder and the air-fuel ratio in the rich combustion cylinder to be smaller in a case in which a transmission of the vehicle is in the D-position than in a case in which the transmission is in the N-position. This suppresses the discomfort experienced by the user due to the dither control process when the transmission is in the D-position without excessively reducing the absolute value of the difference between the air-fuel ratio in the lean combustion cylinder and the air-fuel ratio in the rich combustion cylinder in a case in which the transmission is in the N-position.

Example 4

In the controller of any one of Example 1 to Example 3, the idle-time limiting process includes a process of causing, when the internal combustion engine is idling and the vehicle is traveling, the absolute value of the difference between the air-fuel ratio in the lean combustion cylinder and the air-fuel ratio in the rich combustion cylinder to be smaller in a case in which a temperature of the internal combustion engine is low than in a case in which the temperature of the internal combustion engine is high.

The user is more likely to feel vibration of the engine when the temperature of the engine is low than when it is high due to unstable combustion of fuel and a greater friction in the engine, leading to a greater rotational fluctuation. Accordingly, the idle-time limiting process includes a process of causing the absolute value of the difference between the air-fuel ratio in the lean combustion cylinder and the air-fuel ratio in the rich combustion cylinder to be smaller in a case in which the engine temperature is low than in a case in which it is high. This suppresses the discomfort experienced by the user due to the dither control process when the engine temperature is low without excessively reducing the absolute value of the difference between the air-fuel ratio in the lean combustion cylinder and the air-fuel ratio in the rich combustion cylinder in a case in which the engine temperature is high.

Example 5

In the controller of any one of Example 1 to Example 4, the idle-time limiting process includes a process of causing, when the internal combustion engine is idling and the vehicle is traveling, the absolute value of the difference between the air-fuel ratio in the lean combustion cylinder and the air-fuel ratio in the rich combustion cylinder to be smaller in a case in which a rotational speed of the internal combustion engine is low than in a case in which the rotational speed of the internal combustion engine is high.

The user is more likely to feel vibration of the internal combustion engine when the rotational speed is low than when the rotational speed is high since the difference between the torque generated by the combustion in the lean combustion cylinders and the torque generated by the combustion in the rich combustion cylinder more easily becomes noticeable as rotational fluctuation when the rotational speed is low than when the rotational speed is high. Accordingly, the idle-time limiting process includes a process of causing the absolute value of the difference between the air-fuel ratio in the lean combustion cylinder and the air-fuel ratio in the rich combustion cylinder to be smaller in a case in which the rotational speed is low than in a case in which it is high. This suppresses the discomfort experienced by the user due to the dither control process when the rotational speed of the engine is low without excessively reducing the absolute value of the difference between the air-fuel ratio in the lean combustion cylinder and the air-fuel ratio in the rich combustion cylinder in a case in which the rotational speed of the engine is high.

Example 6

In the controller of any one of Example 1 to Example 5, the idle-time limiting process includes a process of causing, when the internal combustion engine is idling and the vehicle is in a stopped state, the absolute value of the difference between the air-fuel ratio in the lean combustion cylinder and the air-fuel ratio in the rich combustion cylinder to be smaller in a case in which a temperature of the internal combustion engine is low than in a case in which the temperature of the internal combustion engine is high.

The user is more likely to feel vibration of the engine when the temperature of the engine is low than when it is high due to unstable combustion of fuel and a greater friction in the engine, leading to a greater rotational fluctuation. Accordingly, the idle-time limiting process includes a process of causing the absolute value of the difference between the air-fuel ratio in the lean combustion cylinder and the air-fuel ratio in the rich combustion cylinder to be smaller in a case in which the engine temperature is low than in a case in which it is high. This suppresses the discomfort experienced by the user due to the dither control process when the engine temperature is low without excessively reducing the absolute value of the difference between the air-fuel ratio in the lean combustion cylinder and the air-fuel ratio in the rich combustion cylinder in a case in which the engine temperature is high.

Example 7

In the controller of any one of Example 1 to Example 6, the idle-time limiting process includes a process of causing, when the internal combustion engine is idling and the vehicle is in a stopped state, the absolute value of the difference between the air-fuel ratio in the lean combustion cylinder and the air-fuel ratio in the rich combustion cylinder to be smaller in a case in which a rotational speed of the internal combustion engine is low than in a case in which the rotational speed of the internal combustion engine is high.

The user is more likely to feel vibration of the internal combustion engine when the rotational speed is low than when the rotational speed is high since the difference between the torque generated by the combustion in the lean combustion cylinders and the torque generated by the combustion in the rich combustion cylinder more easily becomes noticeable as rotational fluctuation when the rotational speed is low than when the rotational speed is high. Accordingly, the idle-time limiting process includes a process of causing the absolute value of the difference between the air-fuel ratio in the lean combustion cylinder and the air-fuel ratio in the rich combustion cylinder to be smaller in a case in which the rotational speed is low than in a case in which it is high. This suppresses the discomfort experienced by the user due to the dither control process when the rotational speed is low without excessively reducing the absolute value of the difference between the air-fuel ratio in the lean combustion cylinder and the air-fuel ratio in the rich combustion cylinder in a case in which the rotational speed of the engine is high.

Other aspects and advantages of the present disclosure will become apparent from the following description, taken in conjunction with the accompanying drawings, illustrating examplary embodiments.

BRIEF DESCRIPTION OF THE DRAWINGS

The disclosure may be understood by reference to the following description together with the accompanying drawings.

DETAILED DESCRIPTION

A controller for an internal combustion engine mounted on a vehicle according to one embodiment will now be described with reference to the drawings.

Figure 1:
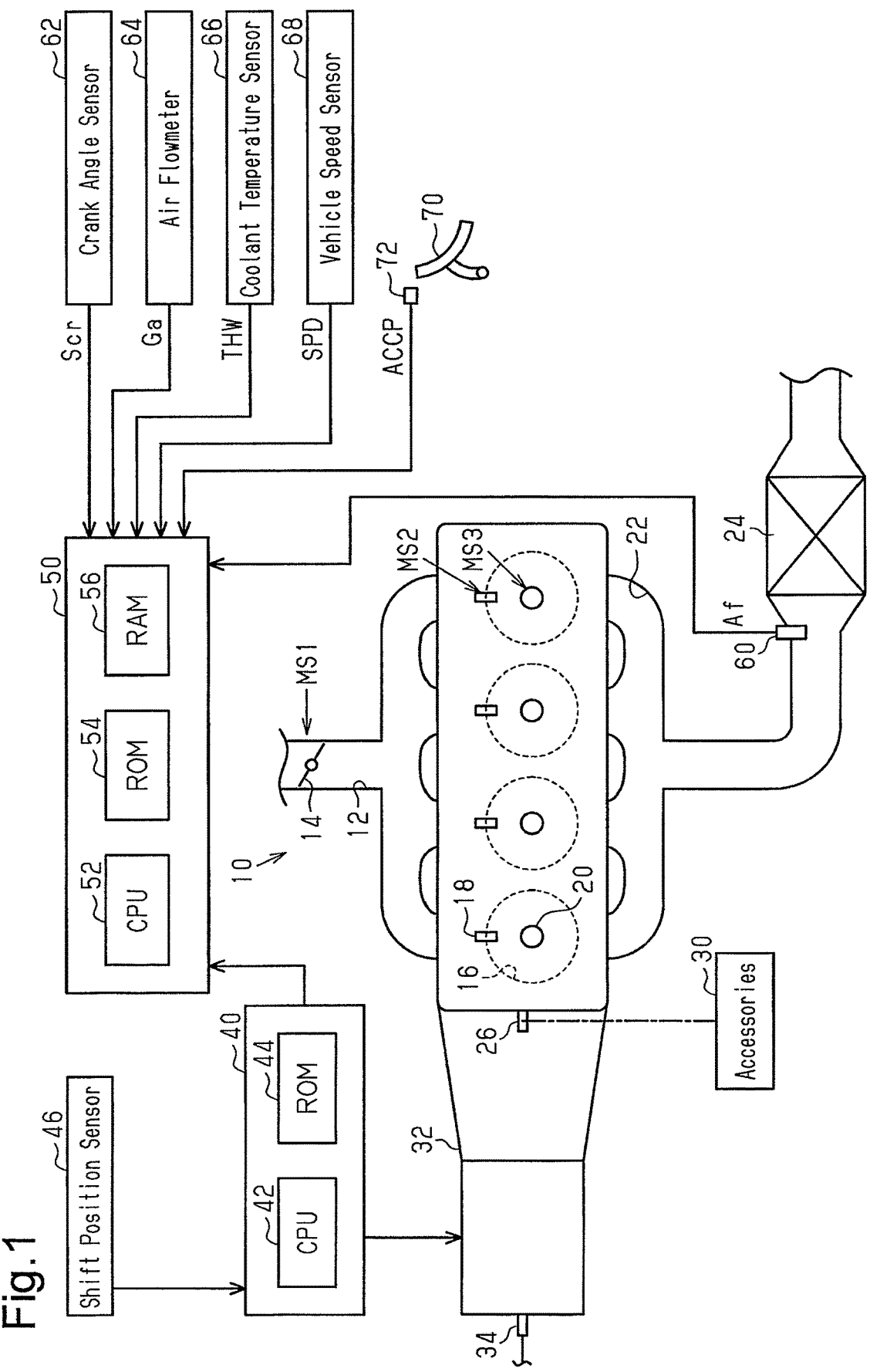
FIG. 1 is a diagram of an internal combustion engine and a controller according to one embodiment.

As shown in FIG. 1, an intake passage 12 of an internal combustion engine 10 is provided with a throttle valve 14. The air drawn in from the intake passage 12 flows into combustion chambers 16 of the respective cylinders. Each of the cylinders #1 to #4 is provided with a fuel injection valve 18 configured to inject fuel and an ignition device 20 configured to generate spark discharge. In each combustion chamber 16, air-fuel mixture is subjected to combustion, and the air-fuel mixture subjected to combustion is exhausted to an exhaust passage 22 as exhaust gas. A three-way catalyst 24 having an oxygen storage capacity is provided in the exhaust passage 22.

The internal combustion engine 10 includes a crankshaft 26, which is connected to accessories 30 such as an alternator and a vehicle air conditioner. The crankshaft 26 is also connected to a transmission 32 having an output shaft 34 connected to the drive wheels.

A transmission controller 40 controls the transmission 32. Specifically, the transmission controller 40 executes control to selectively switch the transmission 32 between a transmission state, in which the transmission 32 transmits power from the crankshaft 26 to the output shaft 34, and a cutoff state, in which the transmission 32 interrupts the power transmission, based on an output signal of a shift position sensor 46. The transmission controller 40 includes a CPU 42 and a ROM 44 and executes the switching control by executing programs stored in the ROM 44 using the CPU 42.

The controller 50 controls the internal combustion engine 10. Specifically, the controller 50 operates the operated portions of the engine 10 such as the throttle valve 14, the fuel injection valves 18, and the ignition devices 20, thereby controlling controlled amounts (torque, exhaust components, and the like) of the internal combustion engine 10. At this time, the controller 50 refers to an air-fuel ratio Af detected by an air-fuel ratio sensor 60 on the upstream side of a three-way catalyst 24, an output signal Scr of a crank angle sensor 62, an intake air amount Ga detected by an air flowmeter 64, and the temperature of the coolant of the engine 10 (coolant temperature THW) detected by a coolant temperature sensor 66. Further, the controller 50 refers to a vehicle speed SPD detected by a vehicle speed sensor 68 and the depression amount of an accelerator pedal 70 (accelerator operation amount ACCP) detected by an accelerator operation amount sensor 72. The controller 50 includes a CPU 52, a ROM 54, and a RAM 56 and executes control of the above-described controlled amounts by executing programs stored in the ROM 54 using the CPU 52.

Figure 2:
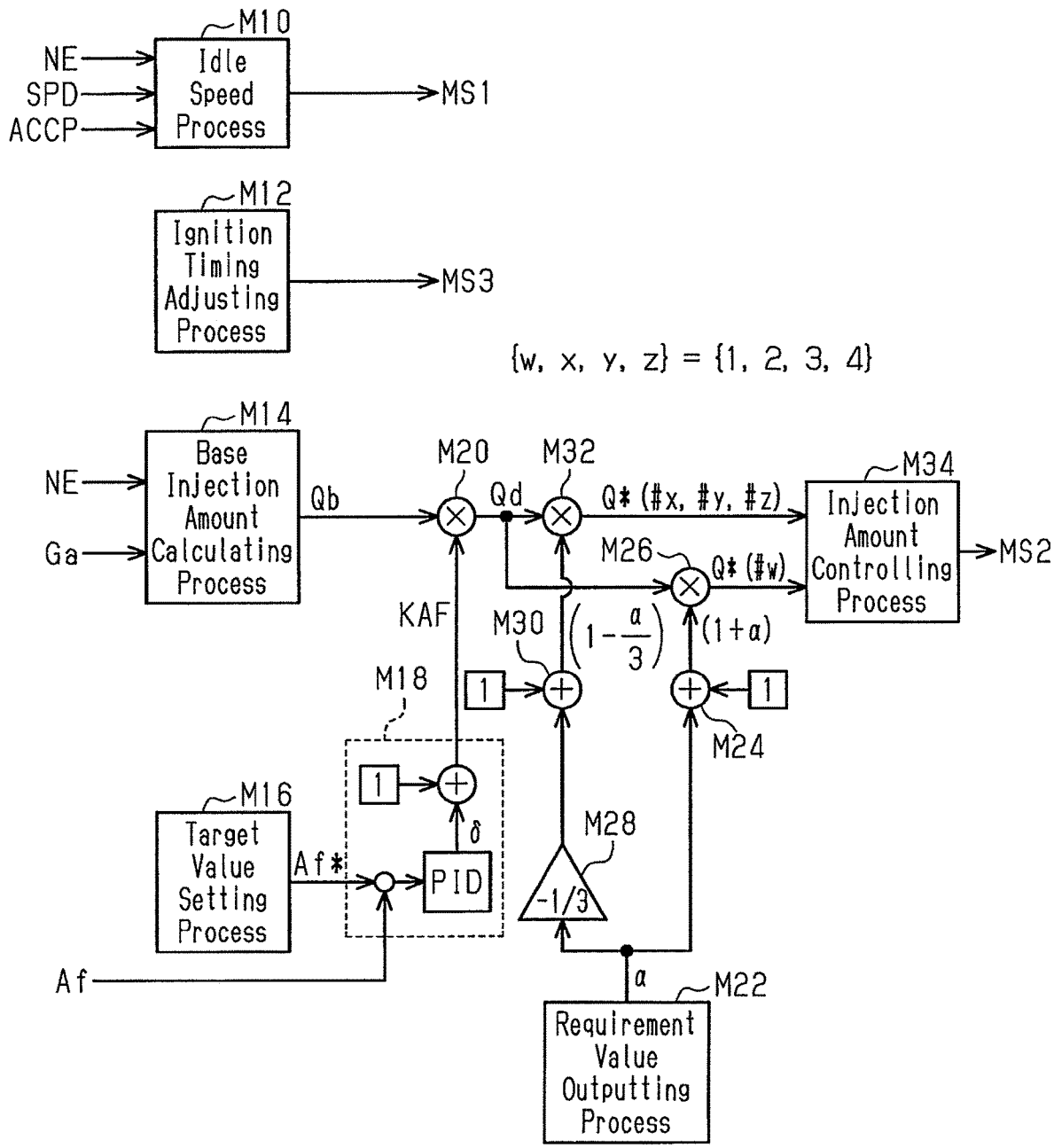
FIG. 2 is a block diagram showing part of processes executed by the controller of FIG. 1.

FIG. 2 shows part of the processes that are implemented by the CPU 52 executing programs stored in the ROM 54.

An idle speed process M10 sets a command value of the opening degree of the throttle valve 14 to perform feedback control to adjust a rotational speed NE to a target rotational speed NE* at idle time of the internal combustion engine 10. The idle speed process M10 also outputs an operation signal MS1, which corresponds to the command value, to the throttle valve 14. The idle time refers to a state in which the accelerator pedal 70 is released. In the present embodiment, the CPU 52 determines that the internal combustion engine engine 10 is at idle time when the accelerator operation amount ACCP is zero. Further, the target rotational speed NE* is set to a greater value when the vehicle is determined to be traveling than when the vehicle is determined to be in a stopped state. The vehicle is determined to be in a stopped state when the vehicle speed SPD is lower than or equal to a specified speed Sth, and the vehicle is determined to be traveling when the vehicle speed SPD exceeds the specified speed Sth. In addition, the target rotational speed NE* is set to a greater value when the load torque applied to the crankshaft 26 by the accessories 30 is great than when it is small.

An ignition timing adjusting process M12 outputs an operation signal MS3 to the ignition devices 20, thereby adjusting the ignition timing of the ignition devices 20. The ignition timing is basically set to the minimum advance for the best torque (MBT), but is retarded in relation to the MBT in a case in which knocking occurs. Also, since the ignition timing is basically retarded in relation to the MBT at least by a predetermined amount at the idle time, the torque can be rapidly adjusted by adjusting the ignition timing.

A base injection amount calculating process M14 calculates a base injection amount Qb based on the intake air amount Ga and the rotational speed NE, which is calculated based on the output signal Scr of the crank angle sensor 62. The base injection amount Qb is an open-loop operation amount, which is an operation amount for executing open-loop control to set the air-fuel ratio of the air-fuel mixture in the combustion chamber 16 to a target air-fuel ratio.

A target value setting process M16 sets a target value Af* of the feedback control amount that is used to control the air-fuel ratio of the air-fuel mixture in the combustion chamber 16 to be the target air-fuel ratio.

A feedback process M18 calculates a feedback operation amount KAF, which is an operation amount used to execute feedback control to adjust the air-fuel ratio Af, which is a feedback control amount, to the target value Af*. In the present embodiment, the difference between the target value Af* and the air-fuel ratio Af is input to each of a proportional element, an integral element, and a differential element, and the sum of the output values of the proportional element, the integral element, and the differential element is calculated as a correction factor δ of the base injection amount Qb. The feedback operation amount KAF is (1+δ).

A feedback correcting process M20 corrects the base injection amount Qb by multiplying the base injection amount Qb by the feedback operation amount KAF, thereby calculating a required injection amount Qd.

A requirement value outputting process M22 calculates and outputs a dither correction requirement value α, which the value of injection amount correction that is required in dither control. In the dither control, the air-fuel ratios of the air-fuel mixture to be burned are differentiated among the cylinders. The fuel injection amount in each cylinder is adjusted such that the components of the entire exhaust gas discharged from the respective cylinders #1 to #4 of the internal combustion engine 10 become equivalent to those in a case in which the air-fuel ratios of the air-fuel mixture to be burned in all the cylinders #1 to #4 are set to the target air-fuel ratio. In the dither control according to the present embodiment, one of the first to fourth cylinders #1 to #4 is designated as a rich combustion cylinder, in which the air-fuel ratio of the air-fuel mixture is richer than the stoichiometric air-fuel ratio, and the remaining three cylinders are designated as lean combustion cylinders, in which the air-fuel ratio of the air-fuel mixture is leaner than the stoichiometric air-fuel ratio. The injection amount in the rich combustion cylinder is set to a value obtained by multiplying the required injection amount Qd by a value (1+α). The injection amount in each lean combustion cylinder is set to a value obtained by multiplying the required injection amount Qd by a value (1−(α/3)). With the above-described setting of the injection amounts for the lean combustion cylinders and the rich combustion cylinder, if the amounts of air filling the cylinders #1 to #4 are the same, the components of the entire exhaust gas discharged from the respective cylinders #1 to #4 of the engine 10 can be made equivalent to those in a case in which the air-fuel ratios of the air-fuel mixture to be burned in all the cylinders #1 to #4 are equal to the target air-fuel ratio. With the above-described setting of the injection amounts, if the amounts of air filling the cylinders #1 to #4 are the same, the reciprocal of the mean value of the fuel-air ratios of the air-fuel mixture to be burned in the cylinders #1 to #4 is the target air-fuel ratio. The fuel-air ratio is the reciprocal of the air-fuel ratio.

A correction coefficient calculating process M24 adds the dither correction requirement value α to 1 to calculate a correction coefficient for the required injection amount Qd with respect to the rich combustion cylinder. A dither correcting process M26 multiplies the required injection amount Qd by the correction coefficient (1+α) to calculate the injection amount command value Q* for the cylinder #w that is designated as the rich combustion cylinder. In this case, w refers to any of 1 to 4.

A multiplication process M28 multiplies the dither correction requirement value α by −⅓. A correction coefficient calculating process M30 adds the output value of the multiplication process M28 to 1 to calculate the correction coefficient for the required injection amount Qd with respect to each lean combustion cylinder. A dither correcting process M32 multiplies the required injection amount Qd by a correction coefficient (1−(α/3)) to calculate the injection amount command value Q* for the cylinders #x, #y, and #z, which are designated as the lean combustion cylinders. In this case, x, y, z are each any of 1 to 4, and w, x, y, z are all different.

An injection amount controlling process M34 generates an operation signal MS2 for the fuel injection valve 18 of the cylinder #w designated as the rich combustion cylinder based on the injection amount command value Q* output by the dither correcting process M26 and outputs the signal MS2 to the same fuel injection valve 18, thereby operating the fuel injection valve 18 such that the amount of fuel injected from the fuel injection valve 18 becomes the amount corresponding to the injection amount command value Q*. Also, the injection amount controlling process M34 generates an operation signal MS2 for the fuel injection valves 18 of the cylinders #x, #y, and #z designated as the lean combustion cylinders based on the injection amount command value Q* output by the dither correcting process M32 and outputs the signal MS2 to the same fuel injection valves 18, thereby operating the fuel injection valves 18 such that the amount of fuel injected from the fuel injection valves 18 becomes the amount corresponding to the injection amount command value Q*.

Figure 3:
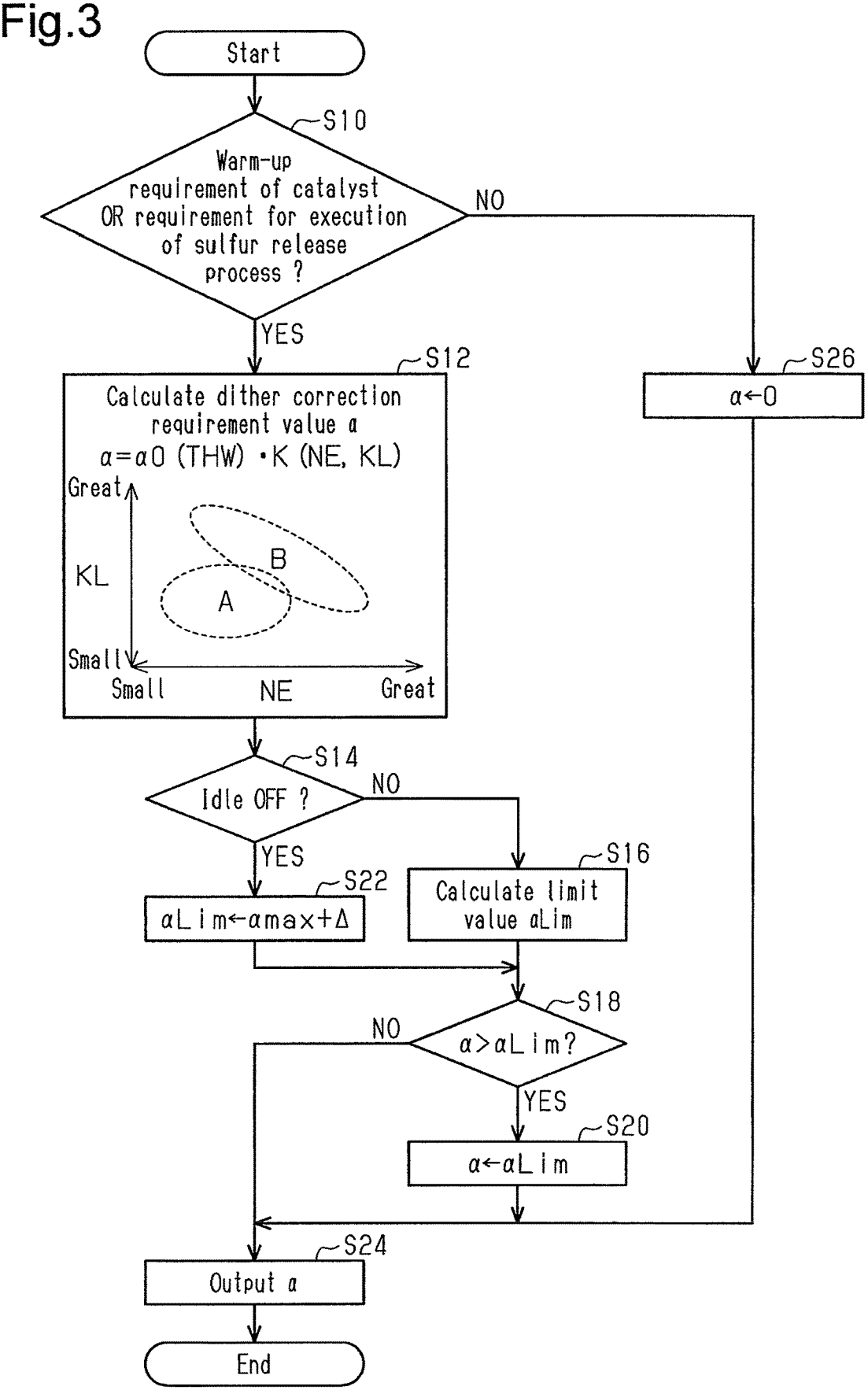
FIG. 3 is a flowchart showing a procedure of a requirement value outputting process executed by the controller of FIG. 1.

FIG. 3 shows the procedure of the requirement value outputting process M22. The process shown in FIG. 3 is executed by the CPU 52 repeatedly executing programs stored in the ROM 54 at a predetermined interval. In the following description, the number of each step is represented by the letter S followed by a numeral.

In the series of processes shown in FIG. 3, the CPU 52 determines whether at least one of the following situations exists: a situation in which there is a warm-up requirement of the three-way catalyst 24 and a situation in which there is a requirement for execution of a sulfur release process (S10). The warm-up requirement of the three-way catalyst 24 arises when the following conditions are both met: a condition (A) that the integrated value InGa of the intake air amount Ga from the start of the engine 10 is greater than or equal to a first specified value Inth1 and a condition (B) that the integrated value InGa is less than or equal to a second specified value Inth2 and the coolant temperature THW is lower than or equal to a predetermined temperature THWth. The condition (A) being met indicates that the temperature of the upstream end of the three-way catalyst 24 has reached the activating temperature. The condition (B) being met indicates that the three-way catalyst 24 has not been entirely activated. On the other hand, the requirement for execution of the sulfur release process arises when the sulfur poisoning amount is greater than or equal to a predetermined amount. In a separate process from that shown in FIG. 3, the CPU 52 calculates a greater increase amount of the sulfur poisoning amount when the required injection amount Qd is great than when the required injection amount Qd is small, and integrates the increase amount to calculate the sulfur poisoning amount.

When determining that at least one of the situation in which there is a warm-up requirement of the three-way catalyst 24 and the situation in which there is a requirement for execution of a sulfur release process exists (S10: YES), the CPU 52 calculates the dither correction requirement value α based on the coolant temperature THW, the rotational speed NE, and a load factor KL (S12). The load factor KL is a parameter indicating the amount of air filling the combustion chamber 16 and is calculated by the CPU 52 based on the intake air amount Ga. The load factor KL is the ratio of the inflow air amount per combustion cycle of one cylinder to a reference inflow air amount. In the present embodiment, the reference inflow air amount is set to the inflow air amount per combustion cycle of one cylinder when the opening degree of the throttle valve 14 is maximized. The reference inflow air amount may be variably set in accordance with the rotational speed NE.

Specifically, the CPU 52 calculates a basic value α0 in accordance with the coolant temperature THW and multiplies the basic value α0 by a correction coefficient K, which is set in accordance with the rotational speed NE and the load factor KL. The CPU 52 substitutes the resultant for the dither correction requirement value α. The CPU 52 calculates the basic value α0 to be a greater value when the coolant temperature THW is low than when the coolant temperature THW is high. This is to increase the temperature increasing performance of the dither control process when the coolant temperature THW is low as compared with when the coolant temperature THW is high.

In a case in which there is a catalyst warm-up requirement, the CPU 52 sets the correction coefficient K to zero if the operating point of the internal combustion engine 10 is outside a relatively low load region A shown in FIG. 3. This is because the exhaust temperature is somewhat high without executing the dither control when the operating point is outside the region A. When the operating point of the internal combustion engine 10 is in the region A, the CPU 52 variably sets the correction coefficient K in a range greater than zero and less than or equal to 1 in accordance with the operating point. In this case, it is possible to set the correction coefficient K to a small value in view of the fact that the exhaust flow rate per unit time is greater when the rotational speed NE is great than when the rotational speed NE is small. It is also possible to set the correction coefficient K to a small value in view of the fact that the exhaust flow rate per unit time is greater when the load factor KL is great than when the load factor KL is small.

Also, in a case in which there is a requirement for execution of the sulfur release process, the CPU 52 sets the correction coefficient K to zero if the operating point of the internal combustion engine 10 is outside a relatively great load region B. This configuration is employed because, to execute the sulfur release process in a region of lower load than the region B, the dither correction requirement value α needs to be set to a value of such a level at which the rotational fluctuation of the crankshaft causes the user to experience discomfort, so that the temperature increasing performance of the dither control is increased significantly. When the operating point of the internal combustion engine 10 is in the region B, the CPU 52 variably sets the correction coefficient K in a range greater than zero and less than or equal to 1 in accordance with the rotational speed NE and the load factor KL.

Specifically, the correction coefficient K can be calculated simply by storing map data having the rotational speed NE and the load factor KL as input variables and the correction coefficient K as an output variable in the ROM 54 and causing the CPU 52 to perform map calculation to obtain the correction coefficient K. The map data refers to a data set of discrete values of the input variable and values of the output variable each corresponding to a value of the input variable. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

Next, the CPU 52 determines whether the internal combustion engine 10 is an idle OFF state (S14). The idle OFF refers to a state in which the internal combustion engine 10 is not idling. When determining that the internal combustion engine 10 is idling (S14: NO), the CPU 52 calculates a limit value αLim using a map based on the shift position information from the transmission controller 40, the vehicle speed SPD, the rotational speed NE, and the coolant temperature THW (S16).

Figure 4:
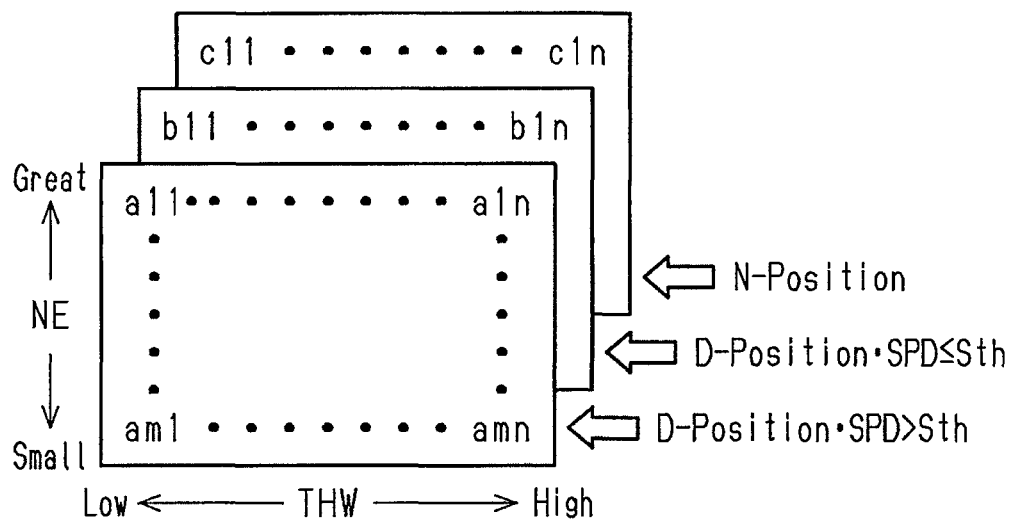
FIG. 4 is a diagram showing map data that defines limit values at idle time.

FIG. 4 schematically shows the map data used in the process of S16. The map data is stored, for example, in the ROM 54. As shown in FIG. 4, the present embodiment includes map data used in a case in which the transmission 32 is in the D-position and the vehicle speed SPD is higher than the specified speed Sth (hereinafter, referred to as a D-position traveling state), map data used in a case in which the transmission 32 is in the D-position and the vehicle speed SPD is lower than or equal to the specified speed Sth (hereinafter referred to as a D-position stopped state), and map data used in a case in which the transmission 32 is in the N-position. FIG. 4 shows an output variable aij (i=1 to m, j=1 to n) of the map data for the D-position traveling state, an output variable bij of the map data for the D-position stopped state, and an output variable cij of the map data for the N-position state. Values of output variables with different values of the variable i correspond to different values of the rotational speed NE, and values of output variables with different values of the variable j correspond to different values of the coolant temperature THW.

As shown in FIG. 4, the output variable cij of the map data for the N-position state and the output variable bij of the map data for the D-position stopped state are smaller than the output variable aij of the map data for the D-position traveling state. This configuration is employed in consideration of the fact that the rotational fluctuation of the internal combustion engine 10 is more easily noticed by the user when the vehicle is in a stopped state than when it is traveling due to the absence of driving noise and the like in a stopped state. Also, the output variable bij of the map data for the D-position stopped state is smaller than the output variable cij of the map data for the N-position state. This configuration is employed in consideration of the fact that, since the power transmission from the crankshaft 26 to the output shaft 34 is possible when the transmission 32 is in the D-position, the vibration of the internal combustion engine 10 is more easily transmitted to the vehicle body via the crankshaft 26 so that the user is more likely to feel the vibration of the engine 10 when the transmission 32 is in the D-position than when the transmission 32 is in the N-position.

As shown in FIG. 4, output variables akt, bkt, ckt, which correspond to higher values of the coolant temperature THW are set to be greater than output variables aks, bks, cks, which correspond to lower values of the coolant temperature THW. This configuration is employed in consideration of the fact that the user is more likely to feel vibration of the internal combustion engine 10 when the coolant temperature THW is low than when the coolant temperature THW is high due to unstable combustion of fuel and a greater friction in the engine 10, leading to a greater rotational fluctuation of the crankshaft 26.

Also, as shown in FIG. 4, output variables atk, btk, ctk, which correspond to lower values of the rotational speed NE, are set to be smaller than output variables ask, bsk, csk, which correspond to higher values of the rotational speed NE. This configuration is employed in consideration of the fact that the user is more likely to feel vibration of the internal combustion engine 10 when the rotational speed NE is low than when the rotational speed NE is high since the difference between the torque generated by the combustion in the lean combustion cylinders and the torque generated by the combustion in the rich combustion cylinder more easily becomes noticeable as rotational fluctuation when the rotational speed NE is low than when the rotational speed NE is high.

The limit value αLim is obtained based on the output variables acquired in the above described manner. When the coolant temperature THW and the operating point of the internal combustion engine 10 are the same, the limit value αLim is smaller than the dither correction requirement value α, which is calculated by the process of S12.

Referring back to FIG. 3, the CPU 52 determines whether the dither correction requirement value α is greater than the limit value αLim (S18). When determining that the dither correction requirement value α is greater than the limit value αLim (S18: YES), the CPU 52 substitutes the limit value αLim for the dither correction requirement value α (S20). Then, the CPU 52 outputs the dither correction requirement value α when the process of S20 is completed or when a negative determination is made in the process of S18 (S24).

In contrast, when determining that the internal combustion engine 10 is in the idle OFF state (S14: YES), the CPU 52 substitutes a value obtained by adding a predetermined amount Δ to the maximum value αmax of the dither correction requirement value α for the limit value αLim (S22), and then proceeds to the process of S18. The process of S22 sets the dither correction requirement value α output in S24 to the value calculated by the process of S12.

In contrast, when determining that there is no warm-up requirement of the three-way catalyst 24 or requirement for execution of the sulfur release process (S10: NO), the CPU 52 substitutes zero for the dither correction requirement value α (S26) and proceeds to the process of S24.

When the process of step S24 is completed, the CPU 52 temporarily ends the series of processes shown in FIG. 3.

An operation of the present embodiment will now be described.

When a warm-up requirement of the three-way catalyst 24 occurs or a request to execute the sulfur release process occurs, the CPU 52 designate one of the cylinders #1 to #4 as a rich combustion cylinder and the remaining cylinders as lean combustion cylinders, and causes, in the three-way catalyst 24, the oxygen discharged from the lean combustion cylinders and the unburned fuel discharged from the rich combustion cylinder to react with each other, thereby raising the temperature of the three-way catalyst 24. At this time, if the internal combustion engine 10 starts idling, the CPU 52 limits the magnitude of the dither correction requirement value α with the limit value αLim. As a result, the dither correction requirement value α is limited such that it is more likely to decrease when the engine 10 is idling than when the engine 10 is not idling. Accordingly, the fluctuation of the crankshaft 26 is suppressed.

Figure 5:
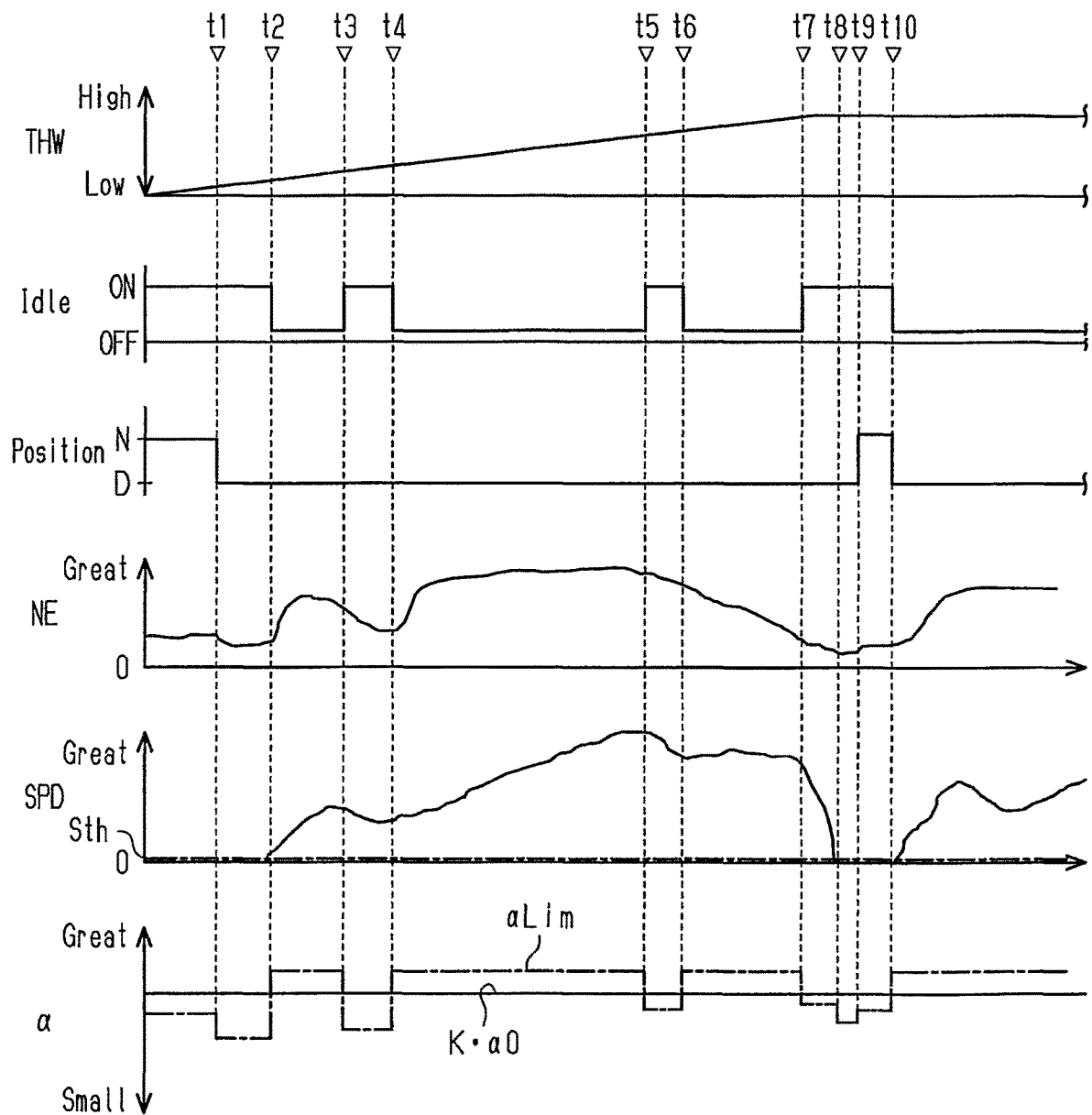
FIG. 5 is a timing diagram illustrating changes of a dither correction requirement value.

FIG. 5 shows changes in the coolant temperature THW, the idling state, the shift position of the transmission 32, the rotational speed NE, the vehicle speed SPD, and the dither correction requirement value α. In FIG. 5, for illustrative purposes, the dither correction requirement value K·α0, which is calculated in the process of S12, is set to a constant value.

As shown in FIG. 5, since the internal combustion engine 10 is idling before the point in time t2, the CPU 52 sets the limit value αLim to a value smaller than K·α0 and limits the dither correction requirement value α to a smaller value. In particular, since the transmission 32 is in the N-position and the internal combustion engine 10 is idling before the point in time t1, the CPU 52 calculates the limit value αLim using the map data for the N-position state. After the point in time t1 and before the point in time t2, the CPU 52 calculates the limit value αLim using the map data for the D-position stopped state. The output variable cij of the map data for the N-position state is greater than the output variable bij of the map data for the D-position stopped state. Therefore, in a case in which the rotational speed NE and the coolant temperature THW are the same, the limit value αLim has a greater value when the transmission 32 is in the N-position and the engine 10 is idling than when the engine 10 is idling in the D-position stopped state. However, since the rotational speed NE, as well as the coolant temperature THW, changes before and after the point in time t1 in FIG. 5, the present example does not directly indicate the magnitude relationships of the limit value αLim in a case in which the rotational speed NE and the coolant temperature THW are the same. In FIG. 5, the rotation speed NE is higher before the point in time t1 than after the point in time t1 because, in a case in which the load torque applied to the crankshaft 26 by the accessories 30 is the same, the idle speed process M10 sets the target rotational speed NE* to a higher value when the transmission 32 is in the N-position than when the vehicle is in the D-position stopped state.

Thereafter, the engine 10 starts idling with the vehicle speed SPD being a value higher than the specified speed Sth in the period from the point in time t3 to the point in time t4. Thus, the CPU 52 calculates the limit value αLim using the map data for the D-position traveling state and limits the magnitude of the dither correction requirement value α to a smaller value based on the calculated limit value αLim. Further, the engine 10 starts idling with the vehicle speed SPD being a value higher than the specified speed Sth in the period from the point in time t5 to the point in time t6. Thus, the CPU 52 calculates the limit value αLim using the map data for the D-position traveling state and limits the magnitude of the dither correction requirement value α to a smaller value based on the calculated limit value αLim. FIG. 5 shows that the limit value αLim in the period from the point in time t5 to the point in time t6 is greater than the limit value αLim in the period from the point in time t3 to the point in time t4. This corresponds to the fact that the output variable aij during the D-position traveling state has a greater value when the coolant temperature THW is high than when the coolant temperature THW is low and has a greater value when the rotational speed NE is high than when the rotational speed NE is low.

Thereafter, the period from the point in time t7 to the point in time t8 represents the idling state when the vehicle decelerates and stops. The period from the point in time t8 to the point in time t9 represents the idling state when the transmission 32 is in the D-position with the vehicle in a stopped state. The period from the point time t9 to the point in time t10 represents the idling state when the transmission 32 is in the N-position. In FIG. 5, the limit value αLim before the vehicle stops is the greatest, and the limit value αLim when the transmission 32 is in the D-position after the vehicle stops is the smallest.

The present embodiment described above further has the following advantages.

(1) When the idle speed process M10 is being executed, the ignition timing adjusting process M12 basically retards the ignition timing by a predetermined amount in relation to the MBT. In this case, as compared with a case in which the ignition timing is set near the MBT, the change amount of the torque of the internal combustion engine 10 due to slight changes in the ignition timing is great, which is likely to increase the torque fluctuation. Therefore, retarding the ignition timing during the idling state can promote the tendency of increase in the rotational fluctuation of the crankshaft 26. Therefore, the process for limiting the dither correction requirement value α during the idling state is particularly of a great utility value.

<Correspondence>

The correspondence between the items in the above embodiments and the items described in the above SUMMARY is as follows. Below, the correspondence is shown for each of the numbers in the examples described in the above SUMMARY.

[1] The exhaust purification device corresponds to the three-way catalyst 24, and the dither control process corresponds to the correction coefficient calculating process M24, the dither correcting process M26, the multiplication process M28, the correction coefficient calculating process M30, the dither correcting process M32, and the injection amount controlling process M34 in a case in which the dither correction requirement value α is greater than zero. The idle-time limiting process corresponds to the processes of S16 to S20 and S24.

[2] The content of the idle-time limiting process in Example 2 corresponds to the setting (aij>cij, bij) in FIG. 4.

[3] The content of the idle-time limiting process in Example 3 corresponds to the setting (cij>bij) in FIG. 4.

[4] The content of the idle-time limiting process in Example 4 corresponds to the setting (aks<akt) in FIG. 4.

[5] The content of the idle-time limiting process in Example 5 corresponds to the setting (ask>atk) in FIG. 4.

[6] The content of the idle-time limiting process in Example 6 corresponds to the setting (bks<bkt) and the setting (cks<ckt) in FIG. 4.

[7] The content of the idle-time limiting process in Example 7 corresponds to the setting (bsk>btk) and the setting (csk>ctk) in FIG. 4.

<Other Embodiments>

At least one feature of the above-illustrated embodiment may be modified as follows.

Regarding Idle-Time Limiting Process

In the above-described embodiment, the output variable bij of the map data for the D-position stopped state is always set smaller than the output variable cij of the map data for the N-position state, but the configuration is not limited to this. For example, the map data for the D-position stopped state and the map data for the N-position state may have the same output variables for some of the operating points of the internal combustion engine 10.

In the above-described embodiment, different map data is prepared for each of the D-position stopped state and the N-position state, but the configuration is not limited to this. For example, the same map data may be used for the D-position stopped state and the N-position state. Even with this configuration, the target rotation speed NE* is set to be higher when the transmission 32 is in the N-position state than when the vehicle is in the D-position stopped state, and thus the limit value αLim tends to be set to a great value.

The map data for the D-position traveling state is not limited to the one that uses the rotational speed NE and the coolant temperature THW as the input variables. For example, only one of the rotational speed NE and the coolant temperature THW may be used as the input variable.

The map data for the D-position stopped state is not limited to the one that uses the rotational speed NE and the coolant temperature THW as the input variables. For example, only one of the rotational speed NE and the coolant temperature THW may be used as the input variable.

The map data for the N-position state is not limited to the one that uses the rotational speed NE and the coolant temperature THW as the input variables. For example, only one of the rotational speed NE and the coolant temperature THW may be used as the input variable.

It is not essential to provide map data having at least one of the rotational speed NE and the coolant temperature THW as an input variable. For example, as the map data for the D-position traveling state, one using the load torque applied to the internal combustion engine 10 by the accessories 30 as an input variable may be used. Also, as the map data for the D-position stopped state, one using the load torque applied to the internal combustion engine 10 by the accessories 30 as an input variable may be used. Further, as the map data for the N-position state, one using the load torque applied to the internal combustion engine 10 by the accessories 30 as an input variable may be used.

Furthermore, the limit value αLim for the dither correction requirement value α does not necessarily need to be used. For example, a process may be executed in which a dither correction requirement value α for idle time is set. This configuration can be implemented, for example, by setting a basic value α0 for idle time. Also, the configuration may be implemented by setting a correction coefficient K for idle time.

Regarding Dither Control Process

In the above-described embodiment, the basic value α0, which is determined in accordance with the coolant temperature THW, is multiplied by the correction coefficient K, which is set in accordance with the rotational speed NE and the load factor KL, to calculate the dither correction requirement value α. However, the configuration is not limited to this. For example, the ROM 54 may store map data having the coolant temperature THW, the rotational speed NE, and the load factor KL as input variables and the dither correction requirement value α as an output variable, and the dither correction requirement value α may be calculated by the CPU 52 using the map.

Further, for example, the dither correction requirement value α may be variably set based on only two parameters, that is, either the set of the rotational speed NE and the coolant temperature THW or the set of the load factor KL and coolant temperature THW. Also, the dither correction requirement value α may be variably set based on only one of the rotational speed NE, the coolant temperature THW, and the load factor KL. In the above-described embodiment, the engine speed NE and the load factor KL are used as parameters for determining the operating point of the internal combustion engine 10. For example, instead of the load factor KL, which is a load, the accelerator operation amount, which is a load, may be used to determine the operating point. Alternatively, the dither correction requirement value α may be variably set in accordance with the intake air amount Ga instead of the engine speed NE and the load.

It is not essential to variably set the dither correction requirement value α based on the operating point of the internal combustion engine. For example, the value for the warm-up requirement and the value for the sulfur release process may each be a single value.

In the above-described embodiment, the number of the lean combustion cylinders is greater than the number of the rich combustion cylinder, but the configuration is not limited to this. For example, the number of the rich combustion cylinders and the number of the lean combustion cylinders may be equal to each other. Alternatively, instead of setting each of the cylinders #1 to #4 to either a lean combustion cylinder or a rich combustion cylinder, the air-fuel ratio of one cylinder may be set to the target air-fuel ratio, for example. Furthermore, if the cylinder filling air amount remains constant in one combustion cycle, the reciprocal of the mean value of the fuel-air ratios does not need to be the target air-fuel ratio. For example, in the case of four cylinders as in the above-described embodiment, if the cylinder filling air amount remains constant, the reciprocal of the mean value of the fuel-air ratios at five strokes may be used as the target air-fuel ratio. Also, the reciprocal of the mean value of the fuel-air ratios at three strokes may be used as the target air-fuel ratio. However, it is desirable that a period in which both a rich combustion cylinder and a lean combustion cylinder exist in a single combustion cycle occur at least once every two combustion cycles. In other words, if the cylinder filling air amount remains constant for a predetermined period, it is desirable to set the predetermined period to two or fewer combustion cycles when setting target air-fuel ratio to the reciprocal of the mean value of the fuel-air ratios. For example, if the predetermined period is set to two combustion cycles and the rich combustion cylinder exists only once during two combustion cycles, the appearance order of the rich combustion cylinder and the lean combustion cylinder is represented by R, L, L, L, L, L, L, L, where the rich combustion cylinder is represented by R, and the lean combustion cylinder is represented by L. In this case, a period of one combustion cycle that is shorter than the predetermined period and represented by R, L, L, L is provided, and part of cylinders #1 to #4 is a lean combustion cylinder and the other cylinders are rich combustion cylinders. When the reciprocal of the mean value of the fuel-air ratios of periods different from one combustion cycle is used as the target air-fuel ratio, it is desirable that the amount of air that is drawn into the internal combustion engine in the intake stroke and is blown back to the intake passage before the intake valve closes be negligible.

Regarding Exhaust Purification Device

In the above-described configuration, the three-way catalyst 24 is presented as the exhaust gas purification device, but the configuration is not limited to this. For example, a gasoline particulate filter (GPF) may be provided downstream of the three-way catalyst 24. Alternatively, the three-way catalyst 24 may be replaced by only a GPF. In this case, however, it is desirable to impart the oxygen storage capacity to the GPF in order to improve the temperature increasing effect by the dither control.

Regarding Warm-Up Request of Exhaust

The temperature increase requirement is not limited to the one in the above-described embodiment. For example, in a configuration equipped with a GPF as in the section "Regarding Exhaust Purification Device," a temperature increase requirement may be a requirement for raising the temperature of the GPF in order to burn particulate matter trapped by the GPF. When a GPF is provided downstream of the three-way catalyst 24, unburnt fuel discharged from the rich combustion cylinder and the oxygen discharged from the lean combustion cylinders may be reacted with each other in the three-way catalyst 24, and the heat of reaction may be used to raise the exhaust temperature downstream of the three-way catalyst 24, so that the GPF is heated. Further, for example, a temperature increase requirement of the exhaust gas by the dither control may arise in order to raise the temperature of the exhaust passage 22 so as to suppress collection of condensed water onto the exhaust passage 22.

Regarding Controller

The controller is not limited to a device that includes the CPU 52 and the ROM 54 and executes software processing. For example, a dedicated hardware circuit (such as an ASIC) may be provided that executes at least part of the software processes executed in the above-described embodiment. That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Internal Combustion Engine

The internal combustion engine is not limited to a four-cylinder engine. For example, an in-line six-cylinder engine may be used. Alternatively, a V engine may be used, which includes a first exhaust purification device and a second exhaust purification device that purify exhaust gas from different cylinders.

Regarding Vehicle

The present disclosure is not limited to a vehicle of which the propelling force is generated only by the internal combustion engine 10, but may be applied to a so-called hybrid vehicle, which is capable of using the power of an internal combustion engine and the power of a rotating electric machine.

Other Modifications

The fuel injection valve is not limited to one that injects fuel into the combustion chamber 16, but may be one that injects fuel, for example, into the intake passage 12. The air-fuel ratio feedback control does not necessarily need to be executed when the dither control is executed.

The invention claimed is:

1. A controller for an internal combustion engine mounted on a vehicle, wherein the internal combustion engine includes an exhaust purification device configured to purify exhaust gas discharged from a plurality of cylinders and a plurality of fuel injection valves provided for the respective cylinders, the controller comprising processing circuitry configured to execute a dither control process of operating the fuel injection valves to designate at least one of the cylinders as a lean combustion cylinder, in which an air-fuel ratio is leaner than a stoichiometric air-fuel ratio, and to designate at least another one of the cylinders as a rich combustion cylinder, in which an air-fuel ratio is richer than the stoichiometric air-fuel ratio, and an idle-time limiting process of causing an absolute value of a difference between the air-fuel ratio in the lean combustion cylinder and the air-fuel ratio in the rich combustion cylinder to be smaller when the internal combustion engine is idling than when the internal combustion engine is not idling.

2. The controller for an internal combustion engine according to claim 1, wherein the idle-time limiting process includes a process of causing the absolute value of the difference between the air-fuel ratio in the lean combustion cylinder and the air-fuel ratio in the rich combustion cylinder to be smaller when the internal combustion engine is idling and the vehicle is in a stopped state than when the internal combustion engine is idling and the vehicle is traveling.

3. The controller for an internal combustion engine according to claim 1, wherein the idle-time limiting process includes a process of causing, when the internal combustion engine is idling and the vehicle is in a stopped state, the absolute value of the difference between the air-fuel ratio in the lean combustion cylinder and the air-fuel ratio in the rich combustion cylinder to be smaller in a case in which a transmission of the vehicle is in a D-position than in a case in which the transmission is in an N-position.

4. The controller for an internal combustion engine according to claim 1, wherein the idle-time limiting process includes a process of causing, when the internal combustion engine is idling and the vehicle is traveling, the absolute value of the difference between the air-fuel ratio in the lean combustion cylinder and the air-fuel ratio in the rich combustion cylinder to be smaller in a case in which a temperature of the internal combustion engine is low than in a case in which the temperature of the internal combustion engine is high.

5. The controller for an internal combustion engine according to claim 1, wherein the idle-time limiting process includes a process of causing, when the internal combustion engine is idling and the vehicle is traveling, the absolute value of the difference between the air-fuel ratio in the lean combustion cylinder and the air-fuel ratio in the rich combustion cylinder to be smaller in a case in which a rotational speed of the internal combustion engine is low than in a case in which the rotational speed of the internal combustion engine is high.

6. The controller for an internal combustion engine according to claim 1, wherein the idle-time limiting process includes a process of causing, when the internal combustion engine is idling and the vehicle is in a stopped state, the absolute value of the difference between the air-fuel ratio in the lean combustion cylinder and the air-fuel ratio in the rich combustion cylinder to be smaller in a case in which a temperature of the internal combustion engine is low than in a case in which the temperature of the internal combustion engine is high.

7. The controller for an internal combustion engine according to claim 1, wherein the idle-time limiting process includes a process of causing, when the internal combustion engine is idling and the vehicle is in a stopped state, the absolute value of the difference between the air-fuel ratio in the lean combustion cylinder and the air-fuel ratio in the rich combustion cylinder to be smaller in a case in which a rotational speed of the internal combustion engine is low than in a case in which the rotational speed of the internal combustion engine is high.

8. A control method for an internal combustion engine mounted on a vehicle, wherein the internal combustion engine includes an exhaust purification device configured to purify exhaust gas discharged from a plurality of cylinders and plurality of fuel injection valves provided for the respective cylinders, the control method comprising:
    executing a dither control process of operating the fuel injection valves to designate at least one of the cylinders as a lean combustion cylinder, in which an air-fuel ratio is leaner than a stoichiometric air-fuel ratio, and to designate at least another one of the cylinders as a rich combustion cylinder, in which an air-fuel ratio is richer than the stoichiometric air-fuel ratio; and
    executing an idle-time limiting process of causing an absolute value of a difference between the air-fuel ratio in the lean combustion cylinder and the air-fuel ratio in the rich combustion cylinder to be smaller when the internal combustion engine is idling than when the internal combustion engine is not idling.

* * * * *